United States Patent
Miyata et al.

(10) Patent No.: US 10,112,468 B2
(45) Date of Patent: Oct. 30, 2018

(54) GLASS RUN FOR AUTOMOBILE DOOR

(71) Applicant: Nishikawa Rubber Co., Ltd., Hiroshima (JP)

(72) Inventors: Tomonori Miyata, Hiroshima (JP); Kenji Shimosako, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 15/623,841

(22) Filed: Jun. 15, 2017

(65) Prior Publication Data

US 2017/0361693 A1 Dec. 21, 2017

(30) Foreign Application Priority Data

Jun. 20, 2016 (JP) ................................ 2016-121727

(51) Int. Cl.
*E06B 7/16* (2006.01)
*B60J 10/763* (2016.01)
*B60J 10/88* (2016.01)
*B60J 10/16* (2016.01)

(52) U.S. Cl.
CPC ............. *B60J 10/763* (2016.02); *B60J 10/16* (2016.02); *B60J 10/88* (2016.02)

(58) Field of Classification Search
CPC .......... B60J 10/763; B60J 10/16; B60J 10/88
USPC ..................................... 49/495.1, 490.1, 441
See application file for complete search history.

(56) References Cited

U.S. PATENT DOCUMENTS

| | | | |
|---|---|---|---|
| 3,813,815 A | 6/1974 | Baermann | |
| 4,656,784 A * | 4/1987 | Brachmann | B60J 10/24 49/374 |
| 5,038,521 A * | 8/1991 | Andrzejewski | B60J 10/248 428/122 |
| 5,317,835 A * | 6/1994 | Dupuy | B60J 10/235 49/377 |
| 5,566,510 A | 10/1996 | Hollingshead | |
| 5,743,047 A * | 4/1998 | Bonne | B60J 10/00 49/441 |
| 6,237,287 B1 | 5/2001 | Nakagawa | |
| 6,240,677 B1 | 6/2001 | Baumann | |
| 8,051,606 B2 * | 11/2011 | Maaβ | B60J 10/74 49/479.1 |
| 8,157,270 B2 | 4/2012 | Tsou | |

(Continued)

FOREIGN PATENT DOCUMENTS

EP 1500542 A1 * 1/2005 ............. B60J 10/78
JP 2004-067091 A 3/2004

(Continued)

*Primary Examiner* — Jerry E Redman
(74) *Attorney, Agent, or Firm* — Alston & Bird LLP

(57) ABSTRACT

A glass run for an automobile door is provided with an enhanced look of a design portion thereof, allowing the glass run to be deformed easily along the curved shape of a window frame during assembly to the window frame, thereby improving ease of assembly. The glass run includes a glass run body 21 including upper and lower planar portions 23*a* and 23*c*, and a design portion 29 forming part of appearance design of an automobile. A material forming the upper and lower planar portions 23*a* and 23*c* and a material forming the design portion 29 respectively contain a resin as a main ingredient. The material forming the design portion 29 is less rigid than the material forming the upper and lower planar portions 23*a* and 23*c*.

17 Claims, 6 Drawing Sheets

OUTSIDE OF CABIN ← → INSIDE OF CABIN

(56) References Cited

U.S. PATENT DOCUMENTS

| | | | |
|---|---|---|---|
| 8,434,267 B2 * | 5/2013 | Bocutto | B60J 10/235 |
| | | | 296/93 |
| 8,458,959 B2 | 6/2013 | Ohtake | |
| 8,464,472 B2 | 6/2013 | Araki | |
| 8,479,449 B2 | 7/2013 | Titz | |
| 8,490,334 B2 | 7/2013 | Miura | |
| 8,667,738 B2 | 3/2014 | Kondo | |
| 8,991,102 B2 | 3/2015 | Minagawa | |
| 9,027,284 B2 * | 5/2015 | Murree | E06B 7/2314 |
| | | | 49/441 |
| 9,845,001 B1 * | 12/2017 | Kojima | B60J 5/0402 |
| 2002/0139054 A1 | 10/2002 | Schlachter | |
| 2004/0111973 A1 * | 6/2004 | Moisy | B60J 10/18 |
| | | | 49/490.1 |
| 2004/0177562 A1 | 9/2004 | Deguchi | |
| 2004/0216384 A1 | 11/2004 | Teramoto | |
| 2006/0162256 A1 | 7/2006 | Tsuchida | |
| 2007/0101656 A1 * | 5/2007 | Stipp | B60J 10/78 |
| | | | 49/490.1 |
| 2008/0030046 A1 * | 2/2008 | Krause | B60J 10/79 |
| | | | 296/146.2 |
| 2013/0067821 A1 * | 3/2013 | Otsuka | B60J 10/248 |
| | | | 49/490.1 |
| 2013/0074417 A1 * | 3/2013 | Kawai | B60J 10/85 |
| | | | 49/490.1 |
| 2013/0232881 A1 * | 9/2013 | Adachi | B60J 10/0025 |
| | | | 49/490.1 |
| 2013/0292965 A1 * | 11/2013 | Prater | B60J 10/0091 |
| | | | 296/146.2 |
| 2014/0059940 A1 | 3/2014 | Eguchi | |
| 2017/0001503 A1 * | 1/2017 | Morioka | B60J 10/27 |

FOREIGN PATENT DOCUMENTS

| | | | | |
|---|---|---|---|---|
| JP | 2013-184627 A | 9/2013 | | |
| JP | 2015-067112 A | 4/2015 | | |
| WO | WO 2008/133115 A1 | 11/2008 | | |
| WO | WO-2012056912 A1 * | 5/2012 | | B60J 10/04 |

* cited by examiner

OUTSIDE OF CABIN ← → INSIDE OF CABIN

OUTSIDE OF CABIN ⟵          ⟶ INSIDE OF CABIN

OUTSIDE OF CABIN ⟵                    ⟶ INSIDE OF CABIN

OUTSIDE OF CABIN ⟵ ⟶ INSIDE OF CABIN

OUTSIDE OF CABIN ←          → INSIDE OF CABIN

GLASS RUN FOR AUTOMOBILE DOOR

CROSS-REFERENCE TO RELATED APPLICATION

This application claims priority to and the benefit of Japanese Patent Application No. 2016-121727, filed on Jun. 20, 2016, the entire disclosure of which as is hereby incorporated by reference herein.

BACKGROUND

Technical Field

The present disclosure relates to a glass run arranged on a window frame of a door of an automobile, in particular to the field of structures assembled to a window frame from outside a cabin.

Description of Related Art

There are various types of automobile side doors, and one of them has a window frame holding a peripheral edge of a window glass. The window frame extends in a lengthwise direction of the automobile in a curve along the shape of a roof. The door having the window frame is provided with a glass run which seals a gap between the window frame and the window glass.

Japanese Unexamined Patent Publication No. 2004-67091 discloses a glass run which is configured to be assembled to the window frame from outside a cabin. Specifically, the window frame has a glass run-mounting planar portion protruding toward the outside of the cabin, and the glass run has a groove into which the glass run-mounting planar portion is inserted. The groove of the glass run may be formed inside a clip made of a hard thermoplastic resin, or inside a metallic reinforcement member embedded in the glass run.

During assembly, the glass run is arranged outside the window frame (outside the cabin), and assembled to the window frame such that the groove engages with the glass run-mounting planar portion. A glass run which is assembled to the window frame from outside the cabin, just like the one disclosed in the Japanese Unexamined Patent Publication No. 2004-67091, is called a "hiding type" glass run which covers a portion of the window frame from outside the cabin. The glass run of this type may sometimes be adopted by taking the requirements for automobile design into consideration, for example.

The "hiding type" glass run disclosed by Japanese Unexamined Patent Publication No. 2004-67091 covers a portion of the window glass from outside the cabin. Thus, a portion of the glass run serves as a design portion forming part of appearance design of the automobile. However, if the clip forming the groove is made of a hard thermoplastic resin as disclosed by Japanese Unexamined Patent Publication No. 2004-67091, the clip needs to have high hardness to prevent the glass run from falling. For this reason, the clip contains a large amount of crystalline resin. If the clip contains a large amount of crystalline resin, sink marks occur easily due to differential shrinkage caused by uneven cooling or any other defects during manufacturing processes. The sink marks may become dimples in the design portion, which may possibly impair the appearance design of the automobile.

As a solution for this problem, a flat, metallic reinforcement member may be additionally embedded in the hard thermoplastic resin of Japanese Unexamined Patent Publication No. 2004-67091, where the hard thermoplastic resin is used as a sole material for the clip. If the flat, metallic reinforcement member is embedded, the appearance design of the automobile may be prevented from becoming deteriorated because no differential shrinkage occurs. However, since the window frame is curved as described above, it is difficult to deform the clip having the flat, metallic reinforcement member embedded therein along the curved shape of the window frame, which may impair the ease of assembly. Further, if the flat, metallic reinforcement member is embedded, the glass run becomes heavier than in the case where the clip is made of the hard thermoplastic resin only. As a result, the demand for weight reduction of the automobile cannot be met.

As another possible solution, a glass run having a clip made of a hard thermoplastic resin only may be formed by extrusion molding. However, the glass run thus extrusion-molded also needs to be deformed along the curved shape of the window frame during assembly. At this time, if the hard thermoplastic resin had a higher hardness as described above, greater force would be required to deform the hard thermoplastic resin, which would impair the ease of assembly. Further, it may also be possible to extrusion-mold a glass run into the curved shape in advance. However, the glass run cannot easily be extrusion-molded into the shape curved along the shape of the window frame. In addition, the window frame and the glass run may have deviations in shape within manufacturing tolerances, which in turn requires the glass run to be deformed along the curved shape of the window frame during assembly. This eventually impairs the ease of assembly.

BRIEF SUMMARY

In view of the foregoing, it is therefore an object of the present disclosure to provide a glass run, which is assembled to a window frame of an automobile to cover a portion of the window frame from outside a cabin, with enhanced look of a design portion of the glass run forming part of appearance design of the automobile, and to allow the glass run to be easily deformed along the curved shape of the window frame, thereby improving the ease of assembly.

To achieve the above-described object, the present disclosure has lowered the rigidity of a material comprising the design portion, thereby improving both of the appearance and the ease of assembly.

A first aspect of the present disclosure is directed to a glass run for an automobile door, the glass run being assembled from outside a cabin to a window frame which extends to define a window opening of the automobile door, and sealing a gap between the window frame and a window glass. The glass run includes: a glass run body which is assembled to a glass run-mounting planar portion of the window frame, the glass run-mounting planar portion protruding toward the outside of the cabin, wherein the glass run body includes a first planar portion and a second planar portion extending in a widthwise direction of an automobile to sandwich the glass run-mounting planar portion from both sides in a thickness direction thereof, and a design portion extending at least between an outer end of the first planar portion and an outer end of the second planar portion and forming part of appearance design of the automobile, the outer ends facing outside the cabin, a material for forming the first and second planar portions and a material forming the design portion respectively contain a resin as a main ingredient, and the material forming the design portion is less rigid than the material forming the first and second planar portions.

According to this configuration, the glass run-mounting planar portion of the window frame is inserted between the first and second planar portions of the glass run body. Then, the first and second planar portions sandwich the glass run-mounting planar portion from both sides in the thickness direction thereof, thereby allowing the glass run for the automobile door to be tightly assembled to the window frame from outside the cabin. In this state, the design portion of the glass run body extending at least between the outer ends of the first and second planar portions partially covers the glass run-mounting planar portion, and forms part of the appearance design of the automobile.

Further, the material forming the design portion is less rigid than the material forming the first and second planar portions. Thus, as compared with a design portion made of a highly rigid material, the design portion made of the less rigid material does not easily vary in thickness during molding, and is less likely affected by uneven cooling of the material which may occur depending on the position of the material in a molding die. This may substantially prevent dimples formed in the surface of the design portion and/or bending of the design portion itself.

Consequently, a good appearance of the design portion is maintained. Note that the design portion may be exposed outside the cabin, or the surface of the design portion may be painted or thinly coated, as long as the design portion forms part of the appearance design of the automobile.

Furthermore, the less rigid design portion extending between the outer ends of the first and second planar portions allows the glass run body to be deformed along the curved shape of the window frame with less force. Thus, the glass run body is easily deformed along the curved shape of the window frame.

Moreover, the first and second planar portions, which are made of a highly rigid material, tightly sandwich the glass run-mounting planar portion from both sides in the thickness direction. This may prevent the glass run body that has been assembled from falling off the glass run-mounting planar portion.

A second aspect of the present disclosure is an embodiment of the first aspect of the present disclosure. According to the second aspect, the glass run for the automobile door further includes a seal that is made of an elastic material and comes into contact with the window glass, wherein the material forming the design portion is more rigid than the elastic material forming the seal.

According to this configuration, the design portion is more rigid than the seal. Thus, after having been assembled, the design portion is not easily corrugated or undulated, thus ensuring a sufficient shape retaining property of the design portion.

A third aspect of the present disclosure is an embodiment of the first aspect of the present disclosure. According to the third aspect, the outer ends of the first and second planar portions are joined to the design portion while being spaced from each other.

According to this configuration, the design portion is present between the outer ends of the first and second planar portions, which allows the outer ends of the first and second planar portions to be relatively displaced, for example, during assembly. This further improves the ease of assembly.

A fourth aspect of the present disclosure is an embodiment of the first aspect of the present disclosure. According to the fourth aspect, the glass run body includes a planar coupling portion which couples together the outer ends of the first and second planar portions, the planar coupling portion is made of the material forming the first and second planar portions, the design portion covers an outer surface of the planar coupling portion facing outside the cabin, and the planar coupling portion is thinner than the design portion.

According to this configuration, the first and second planar portions and the planar coupling portion may be molded integrally. Specifically, the outer ends of the first and second planar portions are coupled via the planar coupling portion having relatively high rigidity, which allows the first and second planar portions to tightly sandwich the glass run-mounting planar portion from both sides in the thickness direction. Further, since the planar coupling portion with high rigidity is thinner than the design portion with low rigidity, the glass run body may be deformed along the curved shape of the window frame with less force during assembly.

A fifth aspect of the present disclosure is an embodiment of the first aspect of the present disclosure. According to the fifth aspect, the design portion protrudes toward an inside of the window opening.

According to this configuration, the design portion extends toward the inside (toward the center) of the window opening. In this case, the advantage of the first aspect of the present disclosure, namely, the improved appearance of the design portion, becomes more remarkable. Further, when the window glass starts being displaced toward the outside of the cabin due to a negative pressure applied during high-speed driving of the automobile, the design portion can support the window glass from outside the cabin. This may reduce the risk of outward displacement of the window glass.

A sixth aspect of the present disclosure is an embodiment of the first aspect of the present disclosure. According to the sixth aspect, the material forming the design portion has a lower flexural modulus than the material forming the first and second planar portions.

According to this configuration, the design portion has a lower flexural modulus than first and second planar portions. Thus, if the glass run body has been extrusion-molded into the linear shape, for example, the glass run body can be deformed along the curved shape of the window frame with less force.

According to the first aspect of the present disclosure, the glass run body includes the first and second planar portions which sandwich the glass run-mounting planar portion of the window frame from both sides in the thickness direction, and the design portion extending at least between the outer ends of the first and second planar portions. Further, the design portion is made of a material which is less rigid than the material forming the first and second planar portions. Thus, the appearance of the design portion may be enhanced, and the glass run is easily deformed along the curved shape of the window frame when assembled to the window frame, thereby improving the ease of assembly. In addition, after having been assembled, the glass run body may be prevented from falling off the glass run-mounting planar portion.

According to the second aspect of the present disclosure, the design portion is more rigid than the seal which comes into contact with the window glass. This may ensure a sufficient shape retaining property of the design portion, thereby further enhancing the look of the design portion.

According to the third aspect of the present disclosure, the design portion having relatively low rigidity is present between the outer ends of the first and second planar portions. This further improves the ease of assembly.

According to the fourth aspect of the present disclosure, the outer ends of the first and second planar portions are coupled via the planar coupling portion, and the planar coupling portion is made of the material forming the first and second planar portions. Thus, the first and second planar portions can tightly sandwich the glass run-mounting planar portion from both sides in the thickness direction. Further, since the highly rigid planar coupling portion is thinner than the less rigid design portion, the glass run body may be deformed along the curved shape of the window frame with less force during assembly, thereby preventing the impairment of the ease of assembly.

According to the fifth aspect of the present disclosure, the design portion protrudes toward the inside of the window opening. Thus, the design portion extends toward the inside of the window opening toward the center thereof. In this case, the advantage of the first aspect of the present disclosure, namely, the improved appearance of the design portion, becomes more remarkable. Moreover, the outward displacement of the window glass during high-speed driving of the automobile may be reduced by the design portion.

According to the sixth aspect of the present disclosure, the design portion has a lower flexural modulus than the material forming the first and second planar portions. This allows the glass run body to be deformed along the curved shape of the window frame with less force, thus further improving the ease of assembly.

DETAILED DESCRIPTION OF VARIOUS EMBODIMENTS

Embodiments of the present disclosure will be described in detail with reference to the drawings. The embodiments described below are merely exemplary ones in nature, and do not intend to limit the scope of the present disclosure or application or uses thereof.

(Configuration of Door)

Figure 1:
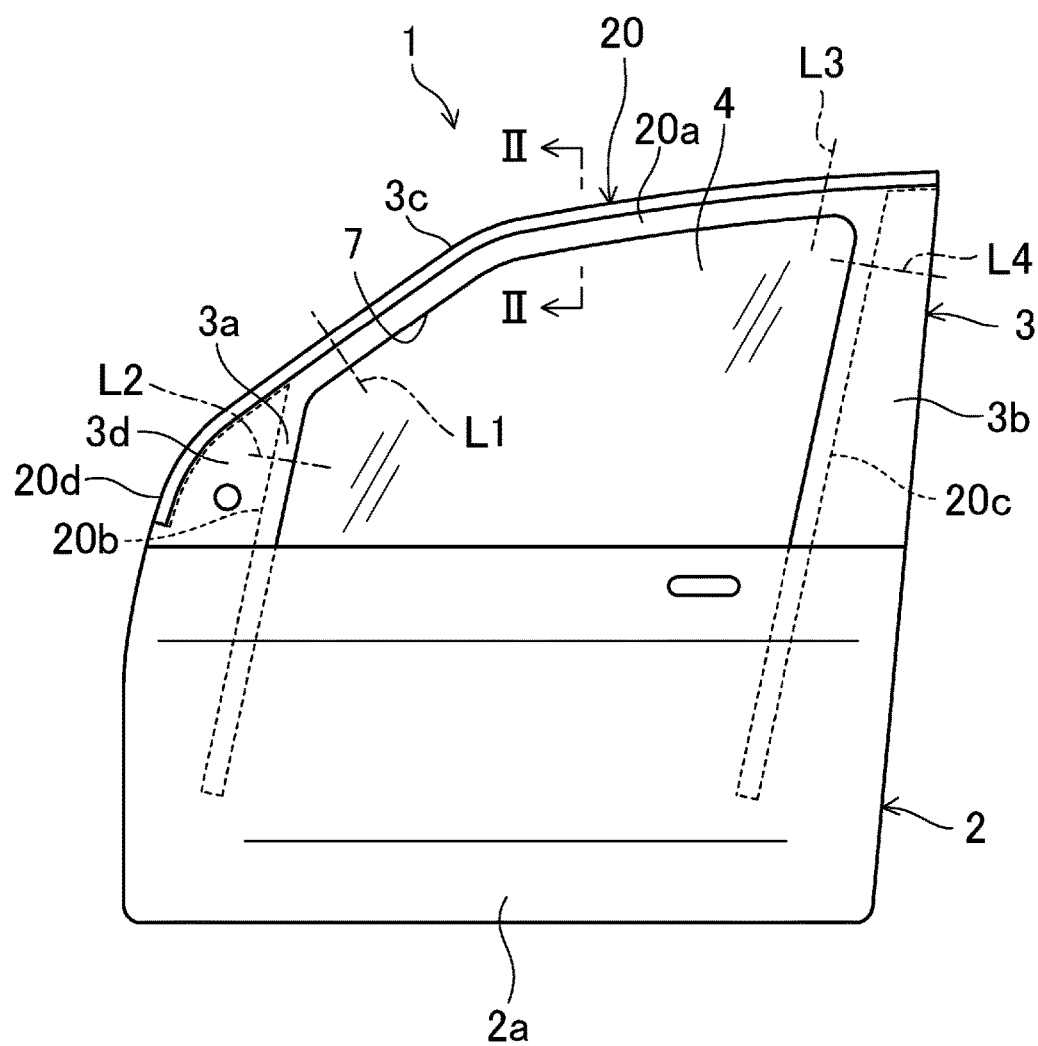
FIG. 1 shows an automobile door including a glass run for an automobile door according to an embodiment, as viewed from outside a cabin.

FIG. 1 is a side view of an automobile door 1 including a glass run 20 for an automobile door according to an embodiment of the present disclosure, as viewed from outside a cabin. The automobile door 1 is a front door arranged near the front of an automobile (not shown) on each side of the automobile, and covers or uncovers an opening (not shown) formed through each side of the automobile near the front of the automobile. Although not shown, if a rear door is arranged on each side of the automobile, the present disclosure may also be applicable to a glass run attached to the rear door.

In the following description of the embodiments, front and rear sides of the automobile may be simply referred to as the "front" and the "rear," respectively.

The automobile door 1 includes a door body 2 comprising substantially a lower half of the automobile door 1, and a window frame 3 comprising substantially an upper half of the automobile door 1. Although not shown, a front end of the door body 2 is attached to a pillar of an automobile body via hinges pivoting about an axis extending in a vertical direction. The door body 2 includes an inner panel (not shown) and outer panel 2a made of a steel sheet or any other suitable material, and is configured to house a window glass 4 which is movable up and down, and a lifting apparatus (not shown) which allows the window glass 4 to move up and down.

Figure 2:
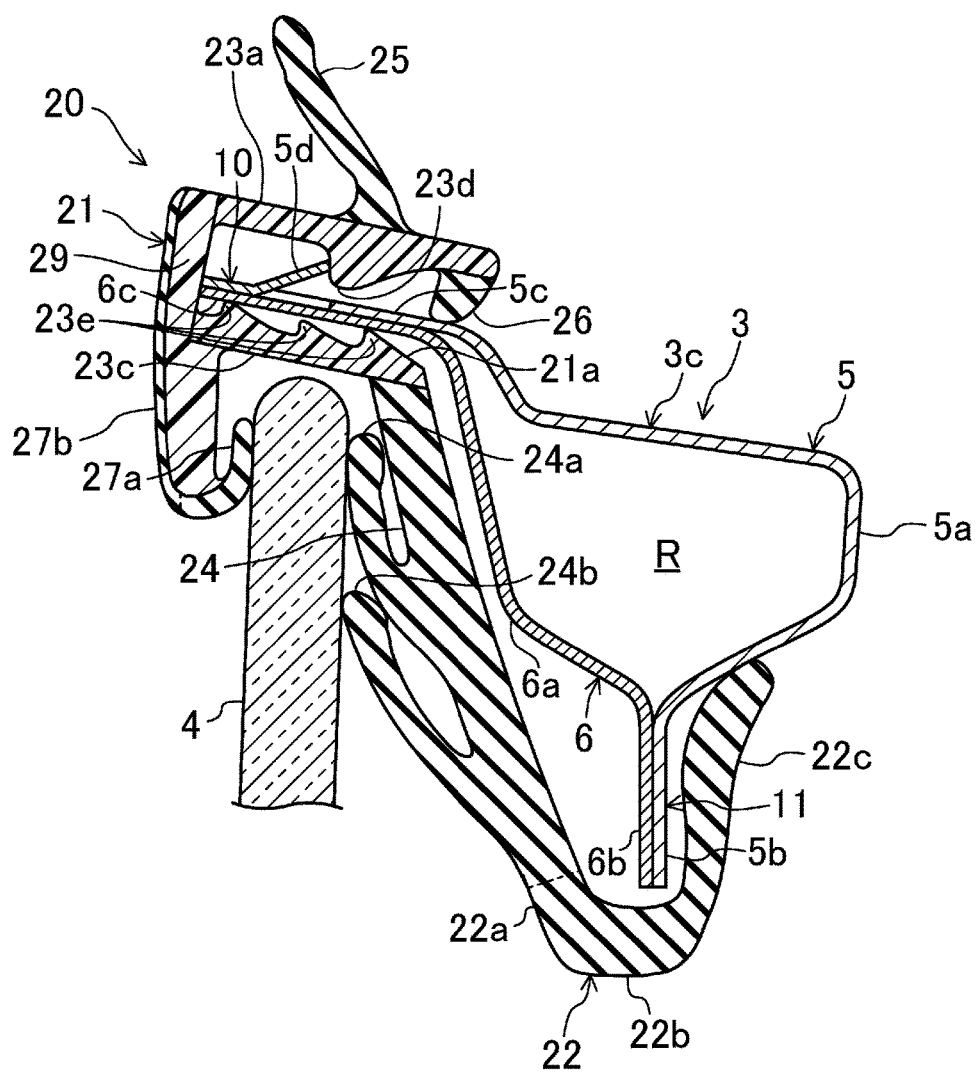
FIG. 2 is a cross-sectional view taken along the plane II-II in FIG. 1.

The window frame 3 functions as a sash holding a peripheral edge of the window glass 4, and extends to define a window opening 7. The window glass 4 is configured to cover or uncover the window opening 7 defined by the window frame 3. The window frame 3 of this embodiment is comprised of a combination of a first panel member 5 and a second panel member 6, both of which are press-formed from a steel sheet or any other suitable material, as shown in FIG. 2. Note that the window frame 3 may be obtained by, for example, roll forming.

As shown in FIG. 1, the window frame 3 is comprised of a front frame portion 3a, a rear frame portion 3b, and an upper frame portion 3c. The front frame portion 3a protrudes upward from a front portion of an upper edge of the door body 2. The rear frame portion 3b extends upward from a rear portion of the upper edge of the door body 2. The rear frame portion 3b extends to be taller than the front frame portion 3a. The upper frame portion 3c extends in a lengthwise direction of the automobile from an upper end of the front frame portion 3a to an upper end of the rear frame portion 3b along a side edge of a roof (not shown) of the automobile body. The shape of the upper frame portion 3c is not limited to the illustrated one. For example, the upper frame portion 3c may be entirely curved upward, or may have a curved portion suitably positioned, or an inclination angle suitably determined, in association with the roof shape of the automobile body.

A door mirror mount 3d to which a door mirror (not shown) is attached forward of the front frame portion 3a of the window frame 3. The door mirror mount 3d has an upper edge portion continuous with the front end portion of the upper frame portion 3c of the window frame 3.

As shown in FIG. 2, the window frame 3 includes a glass run-mounting planar portion 10 protruding toward the outside of the cabin, and an inner peripheral flange 11 protruding toward the inside (toward the center) of the window opening 7 (shown in FIG. 1). The glass run-mounting planar portion 10 extends in the lengthwise direction of the automobile along the upper frame portion 3c, and is curved in the same manner as the upper frame portion 3c when viewed in a side view. Since the inner peripheral flange 11 protrudes toward the inside of the window opening 7, the inner peripheral flange 11 protrudes downward in the upper frame portion 3c. The inner peripheral flange 11 may be configured in the same manner in each of the front and rear frame portions 3a and 3b. In that case, the inner peripheral flange 11 protrudes rearward in the front frame portion 3a, and protrudes forward in the rear frame portion 3b. However, the inner peripheral flange 11 in the front and rear frame portions 3a and 3b may be configured differently from the inner peripheral flange 11 in the upper frame portion 3c.

The first and second panel members 5 and 6 comprising the window frame 3 are configured to define a hollow portion R of a closed section inside the window frame 3. Specifically, the first panel member 5 located further toward the inside of the cabin than the second panel member 6 has an inner bulge 5a which bulges into the cabin at a vertical center portion thereof. The second panel member 6 located further toward the outside of the cabin than the first panel member 5 has an outer bulge 6a which bulges toward the outside of the cabin at a vertical center portion thereof. A portion of the first panel member 5 located further toward the inside of the window opening 7 is an inner planar portion 5b extending toward the inside of the window opening 7. A portion of the second panel member 6 located further toward the inside of the window opening 7 is provided with an inner planar portion 6b extending toward the inside the window opening 7. A portion of the first panel member 5 located further toward the outside of the window opening 7 is provided with an outer planar portion 5c extending toward the outside of the cabin. A portion of the second panel member 6 located further toward the outside of the window opening 7 is an outer planar portion 6c extending toward the outside of the cabin.

The inner planar portions 5b and 6b of the first and second panel members 5 and 6 are stacked and bonded together in a widthwise direction of the automobile, and the outer planar portions 5c and 6c of the first and second panel members 5 and 6 are stacked and bonded together in the vertical direction, thereby forming the hollow portion R between the outer and inner bulges 6a and 5a. Further, the inner planar portions 5b and 6b of the first and second panel members 5 and 6 form the inner peripheral flange 11. Moreover, the outer planar portions 5c and 6c of the first and second panel members 5 and 6 form the glass run-mounting planar portion 10. The outer planar portion 5c of the first panel member 5 forming an upper portion of the glass run-mounting planar portion 10 is partially cut and lifted up to form a rising portion 5d. A base end of the rising portion 5d is closer to an outer end of the outer planar portion 5c facing outside the cabin, and the rising portion 5d is inclined upward from the base end as it goes toward the inside the cabin. The rising portion 5d is provided to prevent a glass run 20 to be described later from falling. However, if the fall of the glass run 20 could be prevented without the rising portion 5d, the rising portion 5d may be omitted.

(Configuration of Glass Run)

The glass run 20 is a so-called "hiding type" glass run which covers at least an outer portion of the window frame 3 closer to the outside of the cabin. As will be described in detail later, the glass run 20 is assembled to the window frame 3 from outside the cabin, and functions as a seal which seals a gap between the window frame 3 and the window glass 4. The glass run 20 also covers an outer surface of the glass run-mounting planar portion 10, which is an outer surface of the window frame 3, and the inner peripheral flange 11.

The glass run 20 is comprised of a combination of an extrusion-molded portion and a die-molded portion. As shown in FIG. 1, a portion around a boundary between an upper glass run 20a and front vertical glass run 20b of the glass run 20, i.e., a portion between boundary lines L1 and L2 (indicated by dash-and-dot lines), is a die-molded portion. The upper glass run 20a is formed by extrusion molding, and is continuous with a door mirror mount 20d extending above the door mirror mount 3d, with a portion being cut out (a space under a lower planar portion 23c to be described later). Further, a portion around a boundary between the upper glass run 20a and rear vertical glass run 20c of the glass run 20, i.e., a portion between boundary lines L3 and L4 (indicated by dash-and-dot lines) is a die-molded portion. Other portions of the glass run are extrusion-molded.

As shown in FIG. 2, the glass run 20 includes a glass run body 21 assembled to the glass run-mounting planar portion 10 of the window frame 3, and an inner decorative lip 22 integrally molded with the glass run body 21. The glass run body 21 includes an upper planar portion (first planar portion) 23a, a lower planar portion (second planar portion) 23c, and a design portion 29.

The upper and lower planar portions 23a and 23c sandwich the glass run-mounting planar portion 10 of the window frame 3 from both sides in a thickness direction thereof (both sides in the vertical direction). Specifically, the upper planar portion 23a extends along an upper surface of the glass run-mounting planar portion 10 in a direction from an outer end (an end facing outside the cabin) of the glass run-mounting planar portion 10 toward the inside of the cabin, and extends from a front end to rear end of the upper frame portion 3c in the lengthwise direction of the automobile. A first protrusion 23d protrudes downward from a widthwise center portion of a lower surface of the upper planar portion 23a. When the glass run-mounting planar portion 10 is inserted between the upper and lower planar portions 23a and 23c, the rising portion 5d abuts from the outside of the cabin, and engages with, the first protrusion 23d. The lower planar portion 23c extends along the lower surface of the glass run-mounting planar portion 10 in a direction from the outer end of the glass run-mounting planar portion 10 toward the inside of the cabin, and extends from the front end to rear end of the upper frame portion 3c in the lengthwise direction. The upper and lower planar portions 23a and 23c are substantially parallel to each other. Second protrusions 23e, 23e, 23e protruding upward from an upper surface of the lower planar portion 23c are arranged to be spaced from each other in the widthwise direction. At least one of the second protrusions 23e, 23e, 23e abuts the lower surface of the glass run-mounting planar portion 10 inserted between the upper and lower planar portions 23a and 23c.

The upper and lower planar portions 23a and 23c of the glass run body 21 form, between their inner ends (ends facing inside the cabin), an insertion port 21a which opens toward the inside of the cabin, and through which the glass run-mounting planar portion 10 of the window frame 3 is inserted. The insertion port 21a has the shape of a long slit extending parallel to the extending direction of the glass run-mounting planar portion 10 in a surface of the glass run body 21 facing the inside of the cabin. Thus, the glass run-mounting planar portion 10 of the window frame 3 is inserted between the upper and lower planar portions 23a and 23c through the insertion port 21a. Since the upper and lower planar portions 23a and 23c extend in the widthwise direction, the glass run-mounting planar portion 10 is inserted toward the outside of the cabin along the widthwise direction. The glass run-mounting planar portion 10 is configured to be inserted deep into the gap between the upper and lower planar portions 23a and 23c.

The design portion 29 extends at least between the outer ends of the upper and lower planar portions 23a and 23c, and partially forms appearance design of the automobile. According to the present embodiment, the outer ends of the upper and lower planar portions 23a and 23c, spaced from each other in the vertical direction, are joined to a surface of the design portion 29 facing the inside of the cabin. Specifically, the design portion 29 extends between the outer ends of the upper and lower planar portions 23*a* and 23*c*, with an upper end of the design portion 29 meeting the outer end of the upper planar portion 23*a*, and a lower end of the design portion 29 protruding downward to a level lower than the outer end of the lower planar portion 23*c*, i.e., toward the inside of the window opening 7. The lower end of the design portion 29 extends to a level lower than the upper end of the window glass 4 in a fully close state. Thus, extending the lower end of the design portion 29 to the level lower than the upper end of the window glass 4 allows the design portion 29 to support the window glass 4 from outside of the cabin if the window glass 4 starts to be displaced toward the outside of the cabin due to a negative pressure applied during high-speed driving of the automobile. Note that a small gap is provided between the surface of the design portion 29 facing the inside of the cabin and the outer surface of the window glass 4 facing the outside of the cabin.

A surface of the design portion 29 facing the outside of the cabin extends in the vertical and lengthwise directions, and forms an appearance design surface of the automobile in a region above the window glass 4. A lower portion (a portion below the lower planar portion 23*c*) of the design portion 29 is thicker than an upper portion (a portion above the lower planar portion 23*c*). The lower portion of the design portion 29 has an inner surface located further toward the inside of the cabin than the upper portion of the design portion 29. That is, the lower portion of the design portion 29 below the lower planar portion 23*c* is closer to the outer surface of the window glass 4.

The material forming the upper and lower planar portions 23*a* and 23*c* and the material forming the design portion 29 respectively contain a resin as a main ingredient. This allows the glass run 20 to have rigidity and strength comparable to those of a glass run made of a hard thermoplastic resin and a metallic member embedded therein, and reduces the weight of the glass run 20. Specifically, required performance may be obtained by using a material containing, as a main ingredient, a generally used thermoplastic resin such as polypropylene, polyethylene, polyamide, polyvinyl chloride, or a polyester resin. One of these resin components may be used solely, or two or more of them may be used in combination, as needed. Among these thermoplastic resins, polypropylene and polyethylene are suitably used, and polypropylene is more suitably used, in view of moldability, durability in outdoor use, weight reduction of a final product, and co-processability with other members. These materials may contain components other than the main resin component, such as a filler, a shock absorbing agent, and a flow modifier.

Examples of the filler may include generally known fillers, such as a plate-like inorganic filler, a fibrous inorganic filler, a powdery inorganic filler, metal fibers, organic fibers, and glass fibers. One of these fillers may be used solely, or two or more of them may be used in combination, as needed. Examples of the plate-like inorganic filler may include talc, mica, and clay minerals. Examples of the fibrous inorganic filler may include glass fibers, whiskers of potassium titanate, and carbon fibers. Examples of the powdery inorganic filler may include calcium carbonate, silica, magnesium hydroxide, and carbon black. Examples of the metal fibers may include aluminum fibers and steel fibers. Examples of the organic fibers may include PET fibers and cellulose fibers. Among them, the plate-like inorganic filler and the powdery inorganic filler are suitably used in view of safety during handling, easy extrusion, and appearance of an extrusion-molded product. Further, the plate-like inorganic filler, in particular talc, is most suitably used in view of linear expansion coefficient, and a balance between rigidity and impact strength.

As the shock absorbing agent, an amorphous elastic body having no melting point, which is generally called rubber, may be used. Examples of the shock absorbing agent may include a copolymer of ethylene and α-olefin, a conjugated diene polymer and hydrogenated products thereof, a copolymer of an aromatic vinyl compound and a conjugated diene compound and hydrogenated products thereof, a copolymer of ethylene, α-olefin, and a conjugated diene compound, a copolymer of ethylene and (meta)acrylic ester, and a copolymer of ethylene and vinyl acetate. Among these shock absorbing agents, the copolymer of ethylene and α-olefin is most suitably used. These shock absorbing agents may be introduced by kneading a product that has been prepared separately from the main resin component into the main resin component. If polypropylene is used as the main resin component, a rubber component may be first polymerized before polymerizing the polypropylene, and then introduced by polymerizing the polypropylene component.

One of the above-listed shock absorbing agents may be used solely, or two or more of them may be used in combination, as needed. The shock absorbing agent contained in the resin provides the upper and lower planar portions 23*a* and 23*c* and the design portion 29 with moderate elasticity, thereby reducing the risk of cracking of the upper and lower planar portions 23*a* and 23*c* and the design portion 29.

Typical examples of the flow modifier may include process oils such as mineral oil and paraffin oil, and plasticizer components such as a phthalate compound, a copolyester compound, and a benzoate compound. If polypropylene is used as the main resin component, mineral oil is suitably used.

If the thermoplastic resin and the shock absorbing agent only were combined, the obtained product would have excessively low rigidity, and shape stability during the extrusion molding would be insufficient. However, the filler, if contained therein, ensures high rigidity and good shape stability during the extrusion molding.

The material forming the design portion 29 is less rigid than the material forming the upper and lower planar portions 23*a* and 23*c*. Specifically, the material forming the design portion 29 and the material forming the upper and lower planar portions 23*a* and 23*c* have different flexural moduli. The material forming the design portion 29 has a flexural modulus of 300 MPa or more and 2000 MPa or less (suitably 500 MPa or more and 1500 MPa or less), and the material forming the upper and lower planar portions 23*a* and 23*c* has a flexural modulus of 2000 MPa or more and 5000 MPa or less (suitably 2000 MPa or more and 4000 MPa or less). The flexural modulus may be changed or controlled by generally known techniques. Changing the type and/or content of the thermoplastic resin as the main ingredient allows the material to exhibit its inherent characteristics. In addition, changing the types and/or contents of the filler and shock absorbing agent provides the material with an arbitrary flexural modulus.

If the flexural modulus of the material forming the design portion 29 is less than 300 MPa, the rigidity of the design portion 29 becomes too low. As a result, the design portion 29 cannot reliably prevent the outward displacement of the window glass 4 due to a negative pressure applied during high-speed driving of the automobile ("suck-out" phenomenon). Thus, the material forming the design portion 29 suitably has a flexural modulus of 300 MPa or more.

If the flexural modulus of the material forming the design portion 29 exceeds 2000 MPa, great force is required to deform the glass run 20 along the curved shape of the upper frame portion 3c during the assembly of the glass run 20 to the window frame 3 (or the glass run 20 cannot be easily deformed in line with the curved shape), which may impair the ease of assembly. Further, if the flexural modulus of the material forming the design portion 29 exceeds 2000 MPa, dimples may easily form in the surface of the design portion 29 or the design portion 29 may easily bend under the influence of change in thickness and/or uneven cooling of the material that may occur depending on the position during molding process. This may impair the appearance design of the automobile. Thus, the material forming the design portion 29 suitably has a flexural modulus of 2000 MPa or less.

If the flexural modulus of the material forming the upper and lower planar portions 23a and 23c were less than 2000 MPa, the upper and lower planar portions 23a and 23c would have insufficient rigidity, and would not stably be fixed to (or held on) the glass run-mounting planar portion 10. This may possibly cause the glass run 20 to fall or wobble. On the other hand, if the flexural modulus of the material forming the upper and lower planar portions 23a and 23c exceeded 5000 MPa, the material itself would easily crack or break, thereby impairing the appearance. In addition, the thickness of the upper and lower planar portions 23a and 23c calculated in view of the rigidity of the glass run would be too small, which may affect the processability. Thus, the material forming the upper and lower planar portions 23a and 23c suitably has a flexural modulus of 2000 MPa or more and 5000 MPa or less. The material forming the upper planar portion 23a and the material forming the lower planar portion 23c may have different flexural moduli, as long as they have higher flexural moduli than the material forming the design portion 29.

The inner decorative lip 22, a planar inner seal portion 24, an upper lip 25, a protrusion 26, and an outer seal lip 27a together serve as a seal of the present disclosure. A material forming these structures constituting the seal may suitably have a hardness of 50 to 89 measured by a type A durometer in conformity with JIS K6253. Examples of such a material may include, but not limited to, a copolymer of ethylene and α-olefin, plasticized polyvinyl chloride, and thermoplastic elastomers such as an olefin-based thermoplastic elastomer, a styrene-based thermoplastic elastomer, a polyester-based thermoplastic elastomer, and a polyurethane-based thermoplastic elastomer. Among these materials, the olefin-based and styrene-based thermoplastic elastomers are suitably used. These structures may be made of the same material, or different materials optionally selected for the respective structures.

The material forming the seal may be foamed or solid. The material forming the seal has low rigidity. Specifically, the material forming the design portion 29 is more rigid than the material forming the seal. The design portion 29 has a flexural modulus of 300-2000 MPa. However, in general, a material having a hardness of 50 to 85 measured by a type A durometer does not allow the measurement of the flexural modulus, the rigidity of the material forming the design portion 29 and the rigidity of the material forming the seal are generally compared with each other in terms of tensile modulus.

For example, the upper and lower planar portions 23a and 23c may be made of a complex of polypropylene and talc having a flexural modulus of 3500 MPa. The design portion 29 may be made of a complex of polypropylene and talc having a flexural modulus of 1100 MPa. The seal may be made of an olefin-based thermoplastic elastomer having a specific gravity of 0.89, and a hardness of 68 measured by a type A durometer.

As shown in FIG. 2, the glass run body 21 includes the planar inner seal portion 24, the upper lip 25, the protrusion 26, and the outer seal lip 27a. The planar inner seal portion 24 extends downward from an inner end (an end located further toward the inside of the cabin than the other end) of the lower surface of the lower planar portion 23c. A lower end of the planar inner seal portion 24 is at a level lower than a lower end of the outer seal lip 27a. The planar inner seal portion 24 is inclined such that the lower it goes, the further toward the inside of the cabin it is located. A first inner seal lip 24a extends toward the outside of the cabin from an outer surface (a surface facing the outside the cabin) of the planar inner seal portion 24. A second inner seal lip 24b also extends toward the outside of the cabin from the outer surface of the planar inner seal portion 24 under the first inner seal lip 24a. The first and second inner seal lips 24a and 24b are inclined such that the more toward the outside of the cabin they extend, the higher they go, and are configured to come into contact with the inner surface of the window glass 4 facing the inside of the cabin. Further, the inner surface of the planar inner seal portion 24 faces the outer bulge 6a of the second panel member 6 of the window frame 3.

The upper lip 25 protrudes upward from a widthwise center portion of an upper surface of the upper planar portion 23a, and is inclined such that the higher it goes, the more toward the outside of the cabin it is located. When the automobile door 1 is closed, the upper lip 25 comes into contact with a body panel (not shown) of the automobile to seal a gap between the body panel and the automobile door 1. The protrusion 26 protrudes downward from an inner end (an end located further toward the inside of the cabin than the other end) of the lower surface of the upper planar portion 23a. A tip end of the protrusion 26 comes into contact with the upper surface of the glass run-mounting planar portion 10 inserted in the insertion port 21a. Thus, a gap between the glass run-mounting planar portion 10 and the glass run body 21 is sealed.

The outer seal lip 27a is integral with the lower end of the design portion 29, bent toward the inside of the cabin, and protrudes upward. The outer seal lip 27a is configured to come into contact with the outer surface of the window glass 4.

The design portion 29 is covered with a skin 27b made of an elastic body forming the outer seal lip 27a. The skin 27b is significantly thinner than the design portion 29, which allows the shape of the outer surface of the design portion 29 to appear on the surface of the skin 27b.

The inner decorative lip 22 is bent around the inner peripheral flange 11 to extend from the outer side to inner side of the inner peripheral flange 11 via the tip end of the inner peripheral flange 11. Specifically, the inner decorative lip 22 includes an outer portion 22a extending downward from a lower end of the planar inner seal portion 24, a bottom portion 22b extending inward from a lower end of the outer portion 22a, and an inner portion 22c extending upward from an inner end (an end located further toward the inside of the cabin than the other end) of the lower portion 22b. Thus, the outer portion 22a, the bottom portion 22b, and the inner portion 22c form a substantially U-shaped cross section which is open upward. The outer portion 22a of the inner decorative lip 22 faces and covers the outer surface of the inner peripheral flange 11. The outer portion 22a may be in contact with the inner peripheral flange 11.

The bottom portion 22b of the inner decorative lip 22 faces and covers the lower end of the inner peripheral flange 11. A gap is formed between the bottom portion 22b and the lower end of the inner peripheral flange 11, but this gap may be eliminated. The inner portion 22c of the inner decorative lip 22 faces and covers the inner surface of the inner peripheral flange 11, and also covers a lower portion of the inner bulge 5a. An upper end of the inner portion 22c is configured to come into contact with the lower portion of the inner bulge 5a. Substantially an upper half of the inner portion 22c is curved toward the inside of the cabin. Thus, the inner decorative lip 22 covering the inner peripheral flange 11 prevents the inner peripheral flange 11 from being exposed. This enhances the appearance, and improves safety by preventing the inner peripheral flange 11 from coming into direct contact with a body part of a passenger.

Figure 3:
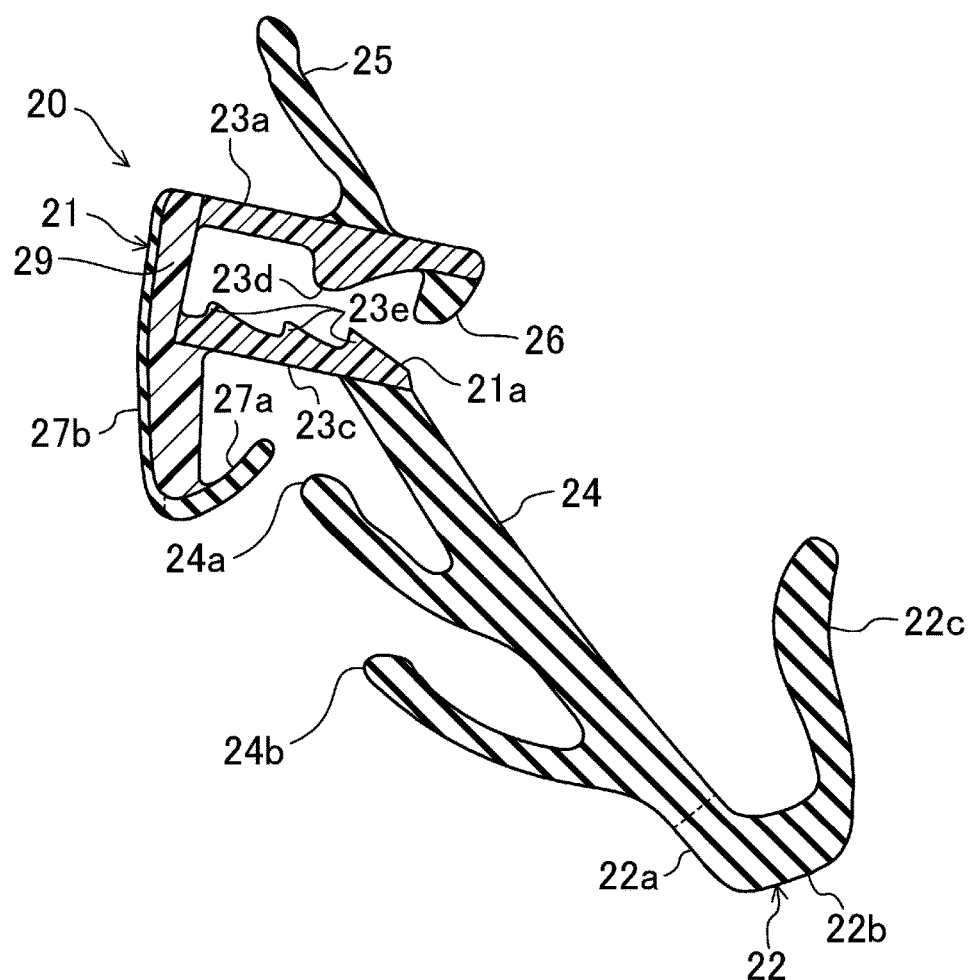
FIG. 3 is a cross-sectional view corresponding to FIG. 2, illustrating a glass run that has been molded.

The glass run 20 that has been extrusion-molded has the shape shown in FIG. 3. As compared with the glass run 20 that has been assembled to the window frame 3 (shown in FIG. 2), the planar inner seal portion 24 is inclined less steeply. Specifically, the glass run 20 has been assembled such that the planar inner seal portion 24 and the lower planar portion 23c form a larger angle than after the assembly. This is for the purpose of facilitating the manufacture, and bringing the planar inner seal portion 24 and the lower planar portion 23c into close contact with the window frame 3 under the elastic force of the planar inner seal portion 24 when the glass run has been assembled.

(Method of Assembling Glass Run)

A method of assembling the glass run 20 configured as described above to the window frame 3 will be described below. First, the glass run 20 molded into the shape shown in FIG. 3 is arranged outside the window frame 3 so that the insertion port 21a of the glass run 20 faces the tip end of the glass run-mounting planar portion 10 of the window frame 3. Then, the glass run 20 is moved toward the inside of the cabin relative to the window frame 3 so that the glass run-mounting planar portion 10 is inserted into the insertion port 21a. At this time, the first protrusion 23d of the upper planar portion 23a moves over the rising portion 5d of the glass run-mounting planar portion 10. When the glass run-mounting planar portion 10 is entirely inserted in the insertion port 21a, the rising portion 5d of the glass run-mounting planar portion 10 abuts, and engages with, the first protrusion 23d from the outside of the cabin. Thus, the glass run body 21 is assembled to the glass run-mounting planar portion 10, while preventing the glass run-mounting planar portion 10 from coming out of the insertion port 21a.

When the glass run-mounting planar portion 10 is inserted into the insertion port 21a, the glass run body 21 needs to be curved along the curved shape of the upper frame portion 3c of the window frame 3. At this time, the design portion 29 is less rigid than the upper and lower planar portions 23a and 23c, and tends to bend easily. Thus, the glass run body 21 can be deformed with less force. As a result, the glass run body 21 is easily deformed in line with the curved shape of the upper frame portion 3c. Although having higher rigidity than the design portion 29, the upper and lower planar portions 23a and 23c can be bent with less force because they have the shape of a plate extending in the widthwise direction of the automobile. This allows the glass run body 21 to be deformed with less force.

In addition, the relatively less rigid design portion 29, extending between the outer ends of the upper and lower planar portions 23a and 23c of the glass run body 21, allows relative displacement of the outer ends of the upper and lower planar portions 23a and 23c during assembly. This further improves the ease of assembly.

Then, the inner decorative lip 22 is assembled to the inner peripheral flange 11 of the window frame 3.

Advantages of Embodiments

As can be seen from the foregoing, according to the above-described embodiment, the glass run-mounting planar portion 10 of the window frame 3 is inserted between the upper and lower planar portions 23a and 23c of the glass run body 21 to be sandwiched between the upper and lower planar portions 23a and 23c from both sides in the thickness direction, thereby allowing the glass run 20 to be tightly assembled to the window frame 3 from outside the cabin. At this time, the design portion 29 of the glass run body 21, extending between the outer ends of the upper and lower planar portions 23a and 23c, covers part of the glass run-mounting planar portion 10, thereby forming part of the appearance design of the automobile.

Further, the material forming the design portion 29 is less rigid than the material forming the upper and lower planar portions 23a and 23c. Thus, as compared with a design portion made of a highly rigid material, the design portion 29 made of the less rigid material does not easily vary in thickness during molding, and is less likely affected by uneven cooling of the material which may occur depending on the position of the material during a molding process. This may substantially prevent dimples formed in the surface of the design portion and/or bending of the design portion itself. Consequently, a good appearance of the design portion 29 is maintained.

Moreover, the presence of the less rigid design portion 29 extending between the outer ends of the upper and lower planar portions 23a and 23c allows the glass run body 21 to be deformed along the curved shape of the upper frame portion 3c with less force during assembly. Thus, the glass run body 21 is easily deformed in line with the curved shape of the upper frame portion 3c.

In addition, the upper and lower planar portions 23a and 23c, which are made of a highly rigid material, tightly sandwich the glass run-mounting planar portion 10 from both sides in the thickness direction. This may prevent the glass run body 21 that has been assembled from being detached from the glass run-mounting planar portion 10.

Figure 4:
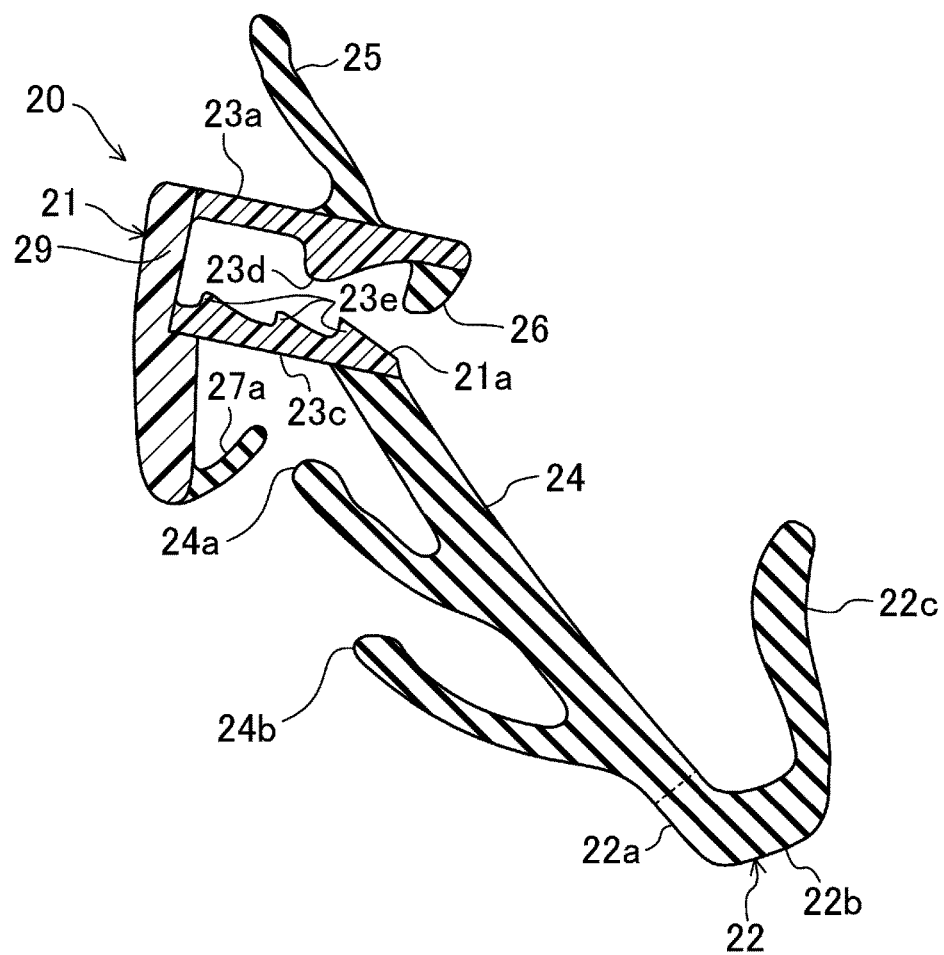
FIG. 4 is a view corresponding to FIG. 3, illustrating a first alternative example of the embodiment.

Note that the surface of the design portion 29 may be painted or thinly coated as long as it forms part of the appearance design of the automobile. As in a first alternative example shown in FIG. 4, the skin 27b may be omitted from the outer surface of the design portion 29 to expose the design portion 29 outside the cabin. In this case, the advantage of the present disclosure, namely, the improved appearance of the design portion, becomes more remarkable.

Figure 5:
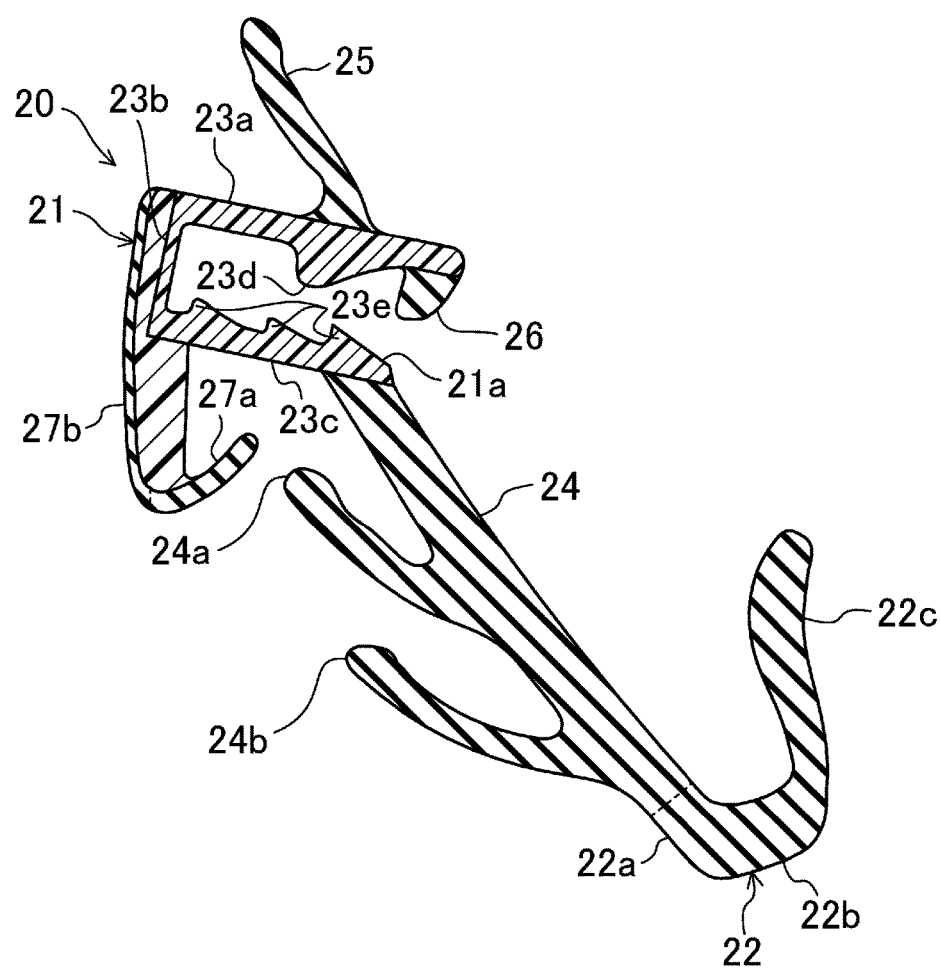
FIG. 5 is a view corresponding to FIG. 3, illustrating a second alternative example of the embodiment.

Further, as in a second alternative example shown in FIG. 5, the glass run body 21 may include a planar coupling portion 23b which couples the outer ends of the upper and lower planar portions 23a and 23c together. The planar coupling portion 23b is made of the material forming the upper and lower planar portions 23a and 23c, and thus, is more rigid than the material forming the design portion 29. In addition, the design portion 29 covers the outer surface of the planar coupling portion 23b facing the outside the cabin. The planar coupling portion 23b is thinner than the design portion 29. In this second alternative example, the upper and lower planar portions 23a and 23c and the planar coupling portion 23b may be integrally molded. Since the outer ends of the upper and lower planar portions 23a and 23c are coupled via the planar coupling portion 23b having relatively high rigidity, the upper and lower planar portions 23a and 23c can tightly sandwich the glass run-mounting planar portion 10 from both sides in the thickness direction. On top of that, since the planar coupling portion 23b is thinner than the design portion 29, the glass run body 21 may be deformed along the curved shape of the upper frame portion 3c of the window frame 3 with less force during assembly.

Figure 6:
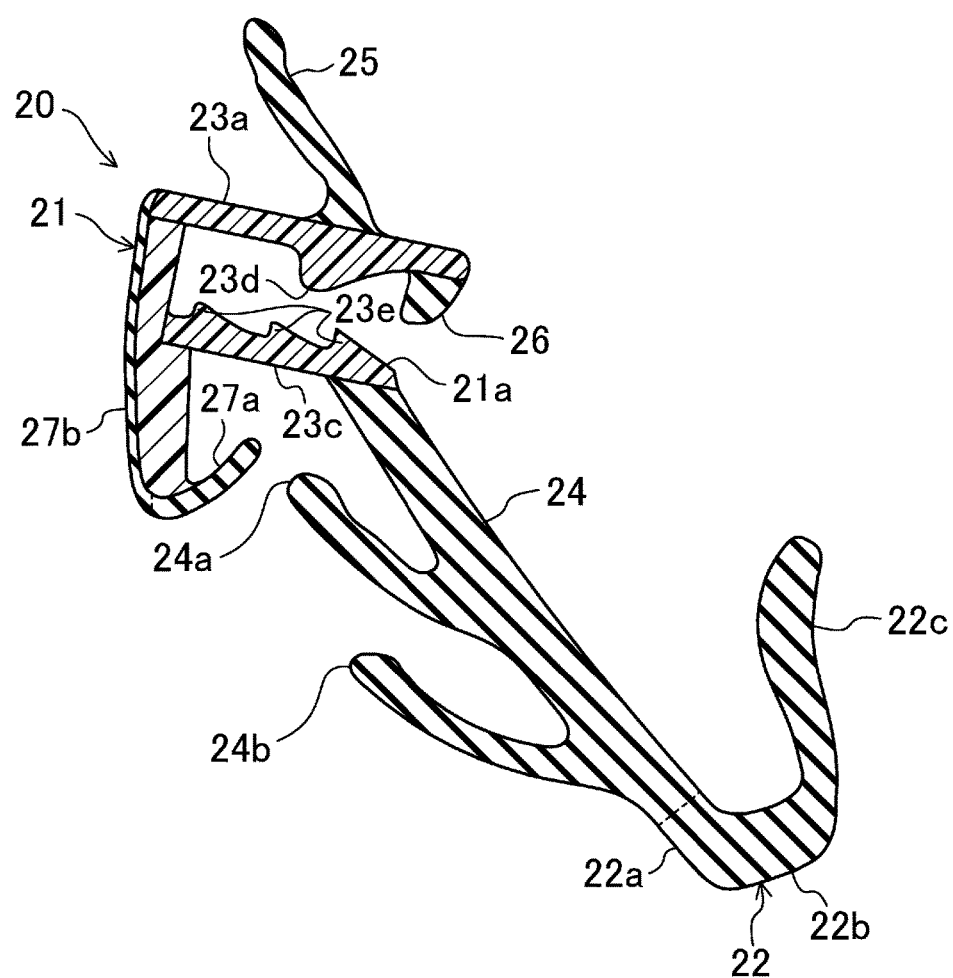
FIG. 6 is a view corresponding to FIG. 3, illustrating a third alternative example of the embodiment.

Furthermore, as in a third alternative example shown in FIG. 6, the outer end of the upper planar portion 23a may extend over the upper end of the design portion 29, and the upper end of the design portion 29 may be joined to the lower surface of the upper planar portion 23a. In this third alternative example, the outer end of the upper planar portion 23a forms part of the appearance design of the automobile. However, the outer end has a significantly small area, and thus, is less conspicuous even if sink marks or any other defects were generated thereon. Therefore, the outer end hardly affects the appearance design. That is, it is sufficient that the design portion 29 extends at least between the outer ends of the upper and lower planar portions 23a and 23c. In addition to being provided between the outer ends of the upper and lower planar portions 23a and 23c, the design portion 29 may also be provided outside the flat coupling portion 23b between the outer ends of the upper and lower planar portions 23a and 23c, as in the second alternative example.

The embodiments described above are merely exemplary ones in nature, and should not be interpreted in a limited manner. Any variations or modifications falling within the range of equivalents to the claims to be described below are all encompassed within the scope of the present invention.

As can be seen from the foregoing, a glass run for an automobile door according to the present disclosure may be used by assembling it to a window frame from outside a cabin.

The invention claimed is:

1. A glass run for an automobile door, the glass run being assembled from outside a cabin to a window frame which extends to define a window opening of the automobile door, and sealing a gap between the window frame and a window glass, the glass run comprising:
a glass run body which is assembled to a glass run-mounting planar portion of the window frame, the glass run-mounting planar portion protruding toward the outside of the cabin,
wherein:
the glass run body includes:
a first planar portion having an outer end,
a second planar portion having an outer end, the second planar portion being separate and spaced apart from the first planar portion in a vertical direction of an automobile, the first and second planar portions each extending in a widthwise direction of the automobile to sandwich the glass run-mounting planar portion from both sides in a thickness direction thereof, and
a design portion having a surface that contacts each of and extends at least between the outer end of the first planar portion and the outer end of the second planar portion, the design portion forming a bridge between the separate first and second planar portions and forming part of appearance design of the automobile, the outer ends facing outside the cabin,
a material forming the first and second planar portions and a material forming the design portion respectively contain a resin as a main ingredient, and
the material forming the design portion is less rigid than the material forming the first and second planar portions.

2. The glass run of claim 1, further comprising:
a seal which is made of an elastic material and comes into contact with the window glass,
wherein the material forming the design portion is more rigid than the elastic material forming the seal.

3. The glass run of claim 1, wherein the outer ends of the first and second planar portions are joined to the design portion while being spaced from each other.

4. The glass run of claim 1, wherein:
the glass run body includes a planar coupling portion which couples together the outer ends of the first and second planar portions,
the planar coupling portion is made of the material forming the first and second planar portions,
the design portion covers an outer surface of the planar coupling portion facing outside the cabin, and
the planar coupling portion is thinner than the design portion.

5. The glass run of claim 1, wherein the design portion protrudes toward an inside of the window opening.

6. The glass run of claim 1, wherein the material forming the design portion has a lower flexural modulus than the material forming the first and second planar portions.

7. The glass run of claim 1, wherein:
the surface of the design portion has first and second opposing ends;
the first end of the design portion aligns with and contacts the outer end of the first planar portion; and
the second end of the design portion extends a distance beyond the outer end of the second planar portion, such that the outer end of the second planar portion contacts the surface of the design portion at a point intermediate the first and second opposing ends.

8. The glass run of claim 7, wherein the distance the second end of the design portion extends beyond the outer end of the second planar portion is greater than a distance between the outer end of the second planar portion and one end of the window glass when the window glass is in a fully closed state.

9. The glass run of claim 8, wherein at least the second end of the design portion is configured to support the window glass from outside the cabin when the window glass is in the fully closed state.

10. The glass run of claim 7, wherein the material forming the design portion has a lower flexural modulus than the material forming the first and second planar portions.

11. The glass run of claim 1, wherein a second end of the design portion extends beyond the outer end of the second planar portion a distance that is greater than a distance between the outer end of the second planar portion and one end of the window glass when the window glass is in a fully closed state.

12. The glass run of claim 11, wherein at least the second end of the design portion is configured to support the window glass from outside the cabin when the window glass is in the fully closed state.

13. The glass run of claim 11, wherein the material forming the design portion has a lower flexural modulus than the material forming the first and second planar portions.

14. The glass run of claim 1, wherein a first end of the design portion is aligned with and directly contacts the outer end of the first planar portion.

15. A glass run for an automobile door, the glass run being assembled from outside a cabin to a window frame which extends to define a window opening of the automobile door, and sealing a gap between the window frame and a window glass, the glass run comprising:
- a glass run body which is assembled to a glass run-mounting planar portion of the window frame, the glass run-mounting planar portion protruding toward the outside of the cabin,
- wherein:
  - the glass run body includes:
    - a first planar portion and a second planar portion extending in a widthwise direction of an automobile to sandwich the glass run-mounting planar portion from both sides in a thickness direction thereof, and
    - a design portion extending at least between an outer end of the first planar portion and an outer end of the second planar portion, the design portion forming part of appearance design of the automobile, the outer ends facing outside the cabin,
  - a material forming the first and second planar portions and a material forming the design portion respectively contain a resin as a main ingredient,
  - the material forming the design portion is less rigid than the material forming the first and second planar portions, and
  - the design portion and the first and second planar portions are extrusion-molded into a linear shape.

16. The glass run of claim 15, wherein:
- the material forming the design portion has a flexural modulus of 300 MPa or more and 2000 MPa or less, and
- the material forming the first and second planar portions has a flexural modulus of 2000 MPa or more and 5000 MPa or less.

17. The glass run of claim 15, wherein:
- the material forming the design portion has a flexural modulus between 300 MPa and 2000 MPa, and
- the material forming the first and second planar portions has a flexural modulus between 2000 MPa and 5000 MPa.

* * * * *